United States Patent
Bohle, II et al.

(10) Patent No.: US 11,724,386 B2
(45) Date of Patent: Aug. 15, 2023

(54) ROBOTIC TOOL HOLDER WITH PASSIVE COMPLIANCE

(71) Applicant: ATI Industrial Automation, Inc., Apex, NC (US)

(72) Inventors: David John Bohle, II, Cary, NC (US); Laleh Alighanbari Jamshidi, Apex, NC (US); Matthew Wayne Ledford, Fuquay-Varina, NC (US); Dylan Blanset, Raleigh, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 422 days.

(21) Appl. No.: 15/931,677

(22) Filed: May 14, 2020

(65) Prior Publication Data

US 2020/0376654 A1     Dec. 3, 2020

Related U.S. Application Data

(60) Provisional application No. 62/853,146, filed on May 27, 2019.

(51) Int. Cl.
*B25J 9/14*     (2006.01)
*B25J 9/16*     (2006.01)
(Continued)

(52) U.S. Cl.
CPC ............ *B25J 9/144* (2013.01); *B25J 9/1633* (2013.01); *B25J 11/005* (2013.01); *B25J 11/006* (2013.01);
(Continued)

(58) Field of Classification Search
CPC ... B25J 9/1633; B25J 9/14; B25J 9/144; B25J 11/005; B25J 11/006; B25J 11/0065;
(Continued)

(56) References Cited

U.S. PATENT DOCUMENTS

| 5,448,146 A | 9/1995 | Erlbacher |
| 5,634,764 A * | 6/1997 | Replogle ............ B23K 11/0066 |
| | | 198/468.4 |

(Continued)

FOREIGN PATENT DOCUMENTS

| CN | 109590853 | * | 4/2019 | ............ B24B 47/14 |
| DE | 3730516 A1 | | 3/1989 | |

(Continued)

OTHER PUBLICATIONS

Machine translation of DE 3730516 (Year: 1989).*
Machine translation of CN 109590853 (Year: 2019).*

*Primary Examiner* — Lee D Wilson
*Assistant Examiner* — Robert F Neibaur
(74) *Attorney, Agent, or Firm* — Coats & Bennett, PLLC

(57) ABSTRACT

A compliance mechanism for holding a robotic finishing tool implements passive force control and compliance using one or more double-acting pneumatic pistons. A desired application force is set and maintained by controlling pneumatic pressure in chambers both fore and aft of the one or more double-acting pneumatic pistons. The pressures in the fore and aft chambers are dynamically controlled, e.g., in response to changes in spatial orientation of the robot arm and tool, to maintain a desired compliance force applied by the robotic finishing tool to a workpiece. An external regulator maintains the fore and aft chamber pressures, for a given spatial orientation, throughout the holder's range of compliance motion. The compliance mechanism includes a (Continued)

plurality of piston bores; the number of active pistons may be adjusted for a given operation, e.g., in response to the finishing tool weight.

13 Claims, 7 Drawing Sheets

(51) Int. Cl.
    *B25J 13/08*       (2006.01)
    *B25J 11/00*       (2006.01)
    *B25J 17/02*       (2006.01)
(52) U.S. Cl.
    CPC ......... *B25J 11/0065* (2013.01); *B25J 13/085* (2013.01); *B25J 17/0225* (2013.01)
(58) Field of Classification Search
    CPC . B25J 13/085; B25J 17/0225; B23Q 11/0025; B23Q 16/003; B23Q 16/008; B24B 23/043; B24B 41/007; B24B 47/14; B24B 49/16; F15B 9/02; F15B 7/02; F15B 13/02; F15B 15/04
    See application file for complete search history.

(56) References Cited

U.S. PATENT DOCUMENTS

| | | | |
|---|---|---|---|
| 7,137,763 B2 * | 11/2006 | Lawson | B23B 31/08 |
| | | | 408/127 |
| 8,360,997 B2 | 1/2013 | Ferrara | |
| 8,696,410 B2 * | 4/2014 | Schussler | B24B 13/00 |
| | | | 310/80 |
| 9,375,841 B1 * | 6/2016 | Kemper | B25J 19/00 |
| 9,855,636 B2 | 1/2018 | Naderer | |
| 9,937,622 B2 | 4/2018 | Naderer et al. | |
| 9,956,452 B2 | 5/2018 | Naderer et al. | |
| 9,993,922 B2 | 6/2018 | Naderer et al. | |
| 2021/0260709 A1 * | 8/2021 | Kotzur | B23Q 5/06 |

FOREIGN PATENT DOCUMENTS

| | | |
|---|---|---|
| DE | 1109830 A1 | 10/1992 |
| DE | 202013008325 U1 | 2/2014 |
| DE | 102017217882 A1 | 4/2017 |

\* cited by examiner

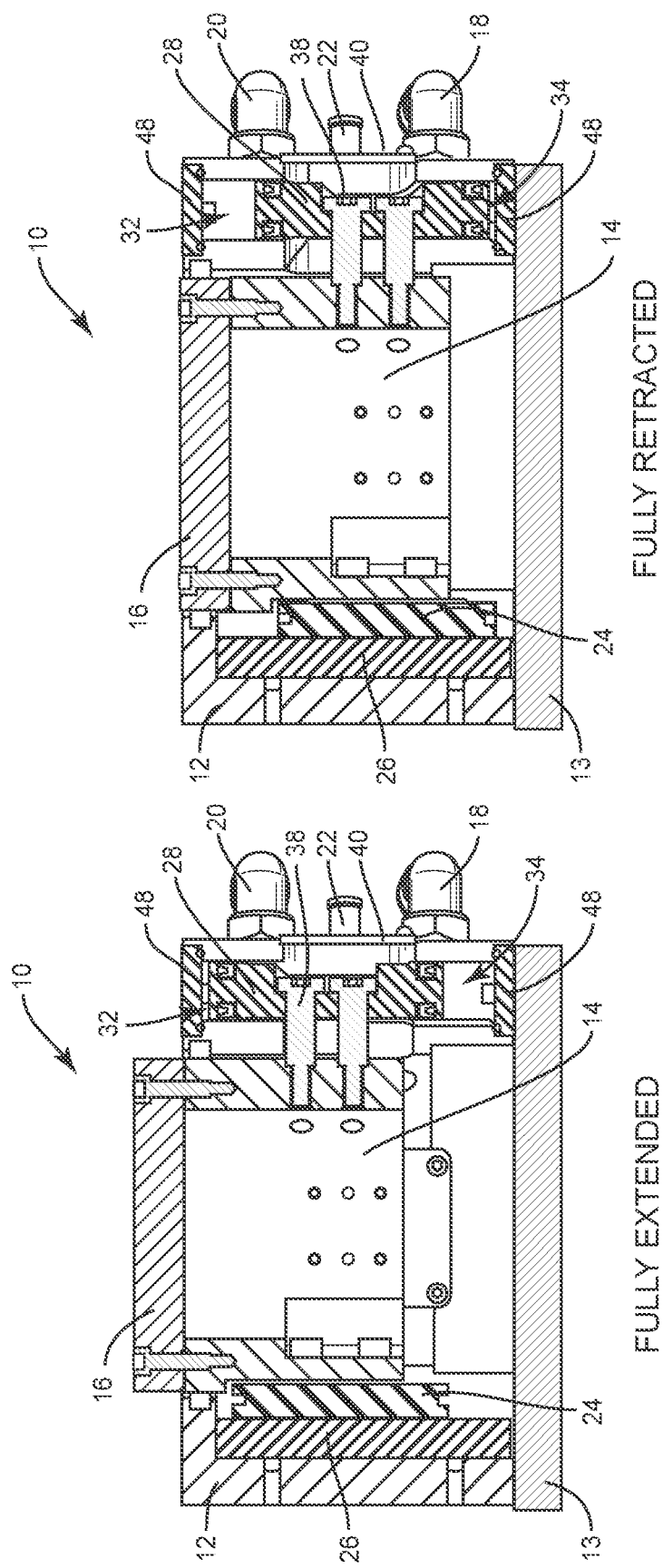

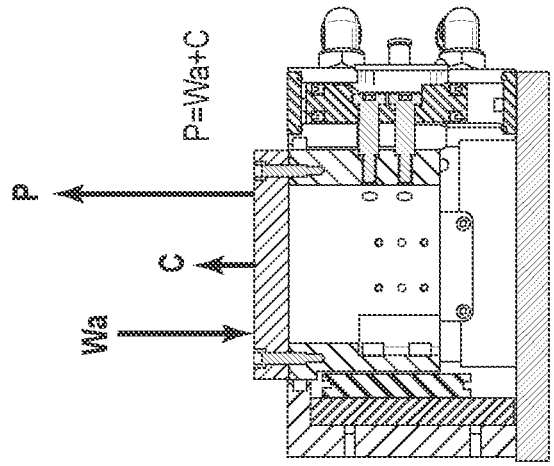
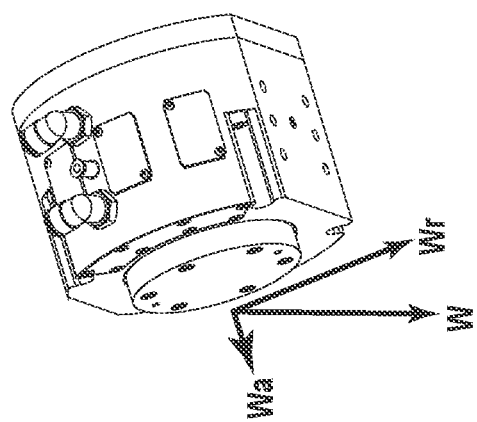
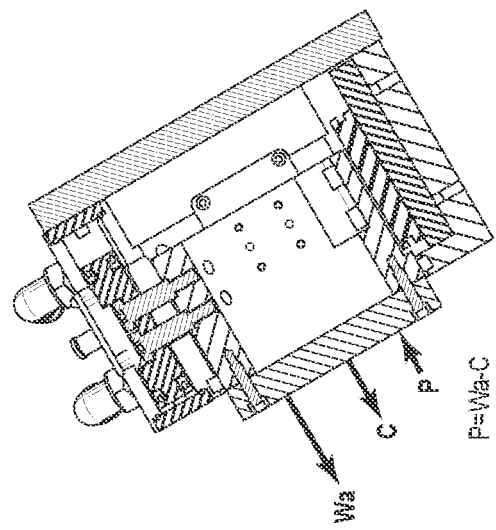
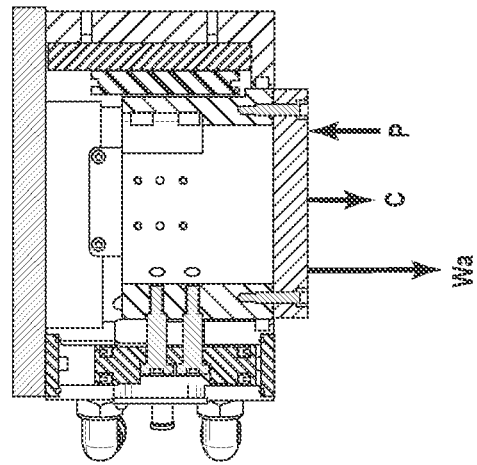
FIG. 4A
FIG. 4B
FIG. 4C
FIG. 4D

ROBOTIC TOOL HOLDER WITH PASSIVE COMPLIANCE

RELATED APPLICATIONS

The present application claims benefit of U.S. Provisional Application 62/853,146, filed May 27, 2019, and is incorporated by reference herein in its entirety.

FIELD OF INVENTION

The present invention relates generally to robotics, and in particular to a robotic tool holding assembly that exhibits passive compliance.

BACKGROUND

Industrial robots have become an indispensable part of modern manufacturing. Robots perform many manufacturing tasks tirelessly, in hostile environments, and with high precision and repeatability.

In many manufacturing processes, the basic dimensional shapes of parts are achieved by machining, casting, forging, molding, or similar processes. These processes are sufficient to meet dimensional specifications, but the parts require additional processing to achieve a desired surface finish. For example, machined parts may require that residual marks and scallops be removed. As another example, parts that are injection molded, cast, or forged may have flashing, gates, and/or parting lines that must be removed. Robotic finishing tools are often used to achieve these finishing operations.

In many applications, directly mounting a robotic finishing tool to a robot arm (or via intermediate components, such as a force/torque sensor) cannot achieve the acceptable finishing results. The robot is programmed to apply the finishing tool—e.g., a grinder, sander, deburring tool, or the like, to specific areas or edges of a workpiece, with a predetermined force between the tool and the workpiece. The applied force is sensed, e.g., by a force/torque sensor, and fed back to the robot controller. The robot controller monitors the sensed force, and compares it to the desired force. Some error invariably exists, such as due to irregularities in the workpiece surface. The robot controller then adjusts the robot arm position, in an attempt to zero the force/torque error between desired and sensed values. However, the stiffness of the robot arm, and the granularity of its positioning, make real-time force adjustments difficult or impossible to achieve.

Accordingly, compliant robotic finishing tool holding mechanisms are known in the art. A compliant tool holding mechanism is an assembly interposed between the robot arm and a finishing tool (sander, grinder, etc.), which allows some compliance, or movement of the tool relative to the robot arm—also referred to as "give" or "slack." Using a compliant holding mechanism, a robotic finishing tool can "glide" over the surface of a workpiece, retracting slightly (toward the robot arm) when it encounters "hills" in the surface, and extending slightly (away from the robot arm) when it encounters "valleys," with the result of applying a consistent force to the workpiece surface throughout the robot's track, or programmed motion, over the workpiece surface.

A simple compliance mechanism, such as a rail mount, telescoping construction, or the like, with a spring providing a bias force, may be sufficient for simple operations, in which the robot arm maintains a consistent relationship with the workpiece. For example, in an operation in which only the upper surface of a workpiece requires finishing, the robot arm may be positioned directly over the workpiece, and the compliance force adjusted to provide a desired force as the finishing tool is moved laterally over the workpiece surface, accounting for surface irregularities via the compliance motion of the compliance mechanism.

However in complex geometries, where curved surfaces, or the sides/edges/bottom of a workpiece must be finished, the spatial orientation of the robot arm and attached tool change during the finishing operation. In this case, the weight of the tool itself (or some component of its weight, depending on the angle with respect to vertical) adds to, or subtracts from, the force applied to the workpiece. Hence, a continuously (or periodically) adjustable force control system is required, to "zero out" the tool weight as the robot arm and tool change spatial orientation, in order to maintain the applied force at a constant, desired value.

Additionally, to amortize the considerable cost of the robot, compliance mechanism, force/torque sensor, and the like, over a variety of finishing tasks, it would be advantageous to be able to utilize the compliance mechanism with a variety of robotic finishing tools. Such tools may, in general, have widely varying sizes and weights.

The Background section of this document is provided to place embodiments of the present invention in technological and operational context, to assist those of skill in the art in understanding their scope and utility. Approaches described in the Background section could be pursued, but are not necessarily approaches that have been previously conceived or pursued. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a compliance mechanism for a robotic finishing tool, such as grinder, sander, or the like, implements passive force control and compliance using one or more double-acting pneumatic pistons. A desired application force is set and maintained by controlling pneumatic pressure in chambers both fore and aft of the one or more double-acting pneumatic pistons. The pressures in the fore and aft chambers are dynamically controlled, e.g., in response to changes in spatial orientation of the robot arm and tool, to maintain a desired force applied by the robotic finishing tool to a workpiece. External regulators maintain the fore and aft chamber pressures, for a given spatial orientation, throughout the holder's range of compliance motion. The compliance mechanism includes a plurality of piston bores; the number of active pistons may be adjusted for a given operation, e.g., in response to the finishing tool weight. One or both sides of two or more of the piston bores are connected in pneumatic fluid flow relationship by a pneumatic manifold. A single pneumatic fluid port for each of the fore and aft sides provides pneumatic fluid to the respective chamber of all configured pistons. Unused piston bores may be sealed off with piston plugs, to isolate the fore and aft chamber pressures.

One embodiment relates to a compliant robotic finishing tool holding mechanism. The compliant robotic finishing tool holding mechanism includes a main housing, and an inner housing moveable in an axial direction within the main housing between retracted and extended positions. One or more axially aligned piston bores are formed in the main housing. An extend air supply port is in pneumatic fluid flow relationship with an aft end of all piston bores, and a retract air supply port is in pneumatic fluid flow relationship with a fore end of all piston bores. The compliant robotic finishing tool holding mechanism includes at least one double-acting pneumatic piston. Each piston is disposed in a piston bore, and is affixed to the inner housing.

Another embodiment relates to a method of passively controlling a compliance force pressing a robotic finishing tool against a workpiece. A compliant robotic finishing tool holding mechanism is interposed between a robot arm and the robotic finishing tool. The compliant robotic finishing tool holding mechanism has an inner housing, moveable in an axial direction within a main housing between retracted and extended positions under the control of one or more double-acting pneumatic pistons affixed to the inner housing and having separate extend and retract air supply ports. For each spatial orientation of the robotic finishing tool, first and second pressure values are obtained. Pneumatic fluid at the first pressure is provided to the extend air supply port, and at the second pressure to the retract air supply port. The difference in the first and second pressures controls a piston force. The compliance force is a function of the piston force and an axial component of the weight of the robotic finishing tool at that spatial orientation. While in each spatial orientation, the supplies of pneumatic fluid to the extend and retract air supply ports are separately regulated to maintain the first and second pressures, respectively, as the inner housing moves within the main housing.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 3A is a section view of the compliant robotic finishing tool holding mechanism in an extended state.

FIG. 3B is a section view of the compliant robotic finishing tool holding mechanism in a retracted state.

FIG. 4A is a tool weight decomposition vector diagram.

FIGS. 4B-D are force diagrams for the compliant robotic finishing tool holding mechanism in different spatial orientations.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figures 1A, 1B, 1C:
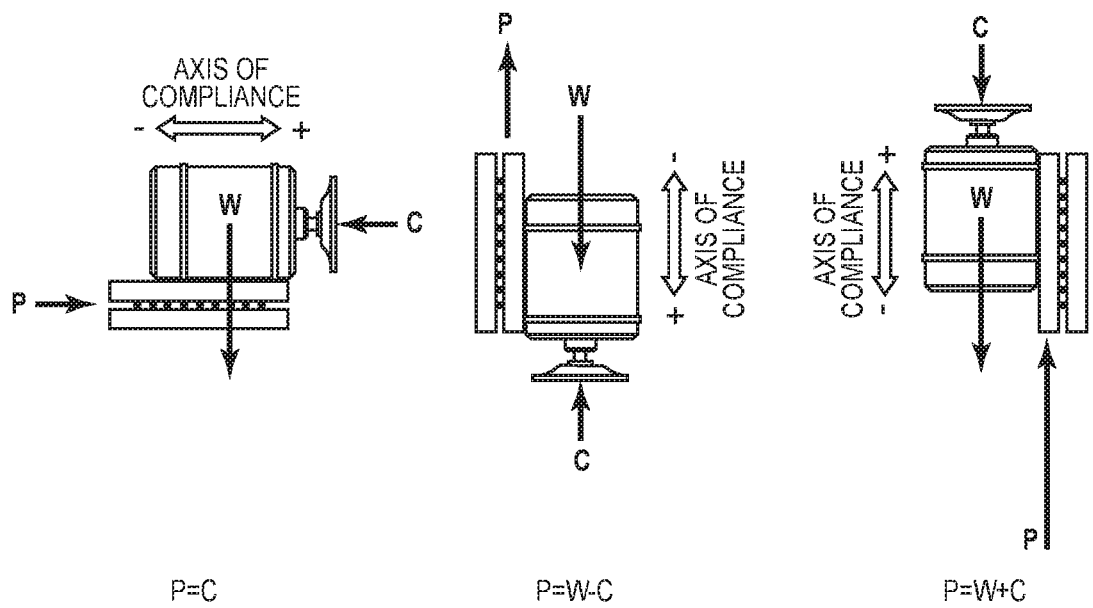
FIGS. 1A-C are force diagrams depicting a varying actuator force to balance tool weight for different spatial orientations of the tool.

FIG. 1 depicts the effects of changing spatial orientation of a robotic finishing tool. The weight of the tool, W, is a constant. Assume the compliance force C, which is the desired force with which the tool is applied to a workpiece surface (or, which is the same magnitude with opposite direction, the force the workpiece applies to the tool) is also constant. However, the force P, applied by a compliant holding mechanism actuator, to achieve a constant desired media force, varies according to the spatial orientation of the tool. In FIG. 1(a), the axis of compliance motion is horizontal, and the actuator force P equals the desired compliance force C, acting in opposite directions; that is, P=C. In this case, the weight of the tool W does not affect the actuator force P. In FIG. 1(b), the robot is positioned over the workpiece surface, and the actuator force P must counteract most of the tool weight W to achieve the desired compliance force C; in this case, P=W−C. In FIG. 2(c), the robot is positioned beneath a workpiece surface, and the actuator force P must both support the entire tool weight W and additionally apply the desired compliance force C; or, P=W+C. In general, the actuator force P must vary as the spatial orientation of the tool changes, to maintain a constant compliance force C.

Figure 2:
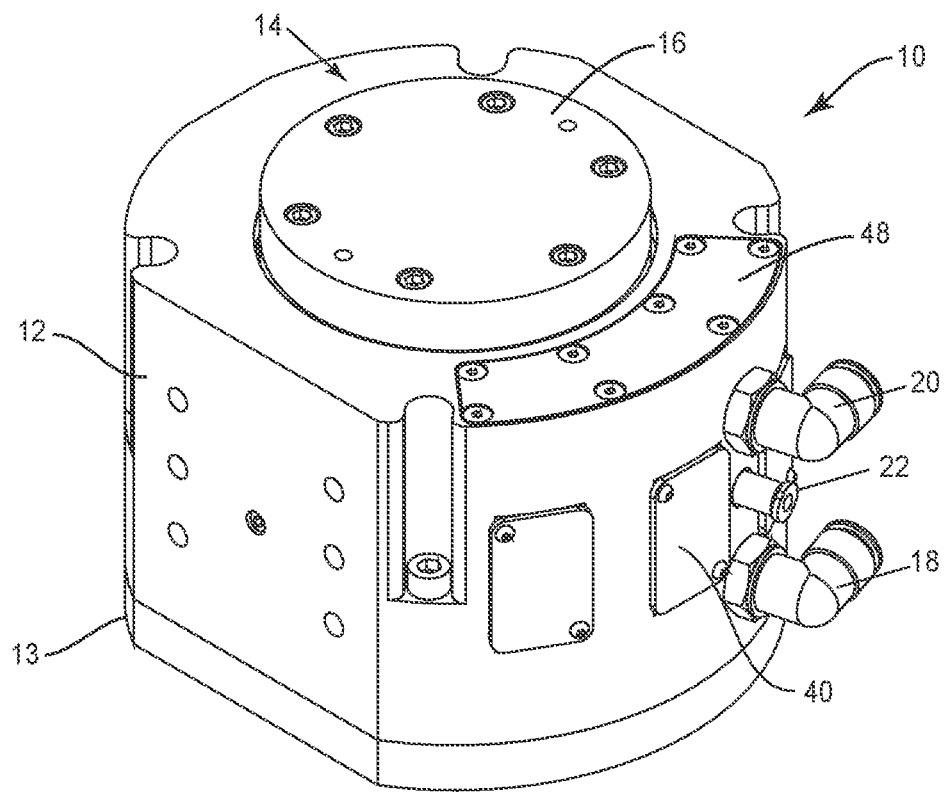
FIG. 2 is a perspective view of a compliant robotic finishing tool holding mechanism.

FIG. 2 depicts a representative perspective view of a compliant robotic finishing tool holding mechanism 10 according to one embodiment of the present invention. The holding mechanism 10 comprises a main housing 12, with a robot interface plate 13 attached to the lower surface thereof, to facilitate attachment of the holding mechanism 10 to a robot arm (not shown). The holding mechanism 10 additionally comprises an inner housing 14, having a tool interface plate 16 at the upper surface thereof. A robotic finishing tool (not shown) is permanently or removably attached to the tool interface plate 16. In either case, the attachment may be directly, or indirectly with one or more other components (e.g., a force/torque sensor) interposed. The inner housing 14 is moveable within the main housing 12, in a telescoping manner. In one embodiment, the inner housing 14 moves between a fully retracted position, where the upper surface of the tool interface plate 16 is flush with the upper surface of the main housing 12, and a fully extended position, as depicted in FIG. 2, where the upper surface of the tool interface plate 16 extends approximately 12 mm from the upper surface of the main housing 12.

A constant desired compliance force (C, also referred to as a media force) is achieved by applying a variable force to the inner housing 14, to counter some or all of the weight of the tool (W) as the robot arm (and hence the holding mechanism 10 and attached tool) change spatial orientation.

According to embodiments of the present invention, this force is supplied by one or more double-acting pneumatic pistons, and hence is referred to herein as a piston force (P). FIG. 2 depicts an extend air supply port 18 and retract air supply port 20, connect to an aft air chamber and a fore air chamber, respectively, of one or more double-acting pistons. As used herein, the terms "extended," "fore," and the like, refer to the direction away from the robot arm and towards the workpiece; the terms "retracted," "aft," and the like, refer to the opposite direction—towards the robot arm and away from the workpiece.

FIG. 2 also depicts a purge air supply port 22. Purge air is constant flow of relatively low pressure compressed air into the interior of the holding mechanism 10, and out of numerous openings and fittings. This creates a constant "purge" flow of air through the holding mechanism 10, which retards the ingress of particulates and debris (e.g., dust from sanding or grinding) during operation and actuation.

Pneumatic systems are common in robotic applications. Abundant amounts of compressed air, at required pressures, temperatures, flow rates, and the like, can be supplied reliably and inexpensively by basic equipment. Compressed air is not flammable or toxic, it carries no shock hazard, and it generates no waste products. Additionally, air is a compressible fluid; hence, a pneumatic piston provides some degree of natural compliance, as it will retract slightly as force is applied to it. As known in the art, double-acting pneumatic piston is one having both an aft and a fore pneumatic chamber, each supplied with a separately regulated air supply. By controlling the air pressures in the aft and fore chambers, the piston may be moved through any point along its axis of travel. Additionally, the compliance force may be controlled by changing the air pressures in the aft and fore chambers.

FIGS. 3A and 3B are section views depicting the workings of the compliant holding mechanism 10. The inner housing 14 moves laterally between a fully retracted position and a fully extended position, guided by a carriage 24 connected to the inner housing 14, and engaging with a rail 26 connected to the main housing 12. The carriage 24 and rail 26 provide a smooth, low-friction motion along the direction of the central axis of the inner housing 14. The position of the inner housing 14, and its degree of compliance force, is controlled by one or more double-acting pneumatic pistons 28. The piston 28 is disposed within a piston bore 30. The piston 28 is shorter than the length of the piston bore 30, defining a fore air chamber 32 and an aft air chamber 34. The fore air chamber 32 receives pneumatic fluid from the retract air supply port 20, and the aft air chamber 34 receives separately-regulated pneumatic fluid from the extend air supply port 18. Seals 36 between the piston 28 and piston bore 30, proximate to each end of the piston 28, seal the fore and aft air chambers 32, 34.

The piston 28, which is moveable within the bore 30 in the main housing 12, is connected to the inner housing 14, such as by shoulder bolts 38, and hence transfers force generated by air pressures in the fore and aft air chambers 32, 34, to the inner housing 14, and thence to the attached tool. An access plate 40 covers an opening in the main housing 12, providing access to the heads of the shoulder bolts 38.

FIG. 3A depicts the compliant robotic finishing tool holding mechanism 10 with the inner housing 14 in a fully extended state. In this embodiment, the tool interface plate 16 is extends approximately 12 mm from the upper surface of the main housing 12. Note that the aft air chamber 34 is maximized, and the fore air chamber 32 is minimized. In contrast, FIG. 3B depicts the compliant robotic finishing tool holding mechanism 10 with the inner housing 14 in a fully retracted state. The tool interface plate 16 is flush with the upper surface of the main housing 12. Note that the aft air chamber 34 is minimized, and the fore air chamber 32 is maximized.

To control the compliance force applied to a workpiece, the air pressure in one air chamber 32, 34 is set to a predetermined value, and the air pressure in the other air chamber 34, 32 is varied, in response to spatial orientation of the robotic finishing tool holding mechanism 10, to maintain a constant, desired compliance force with which the tool presses against a workpiece surface. Additionally, the pressure in both air chambers 32, 34 is regulated in response to compliance motion of the inner housing 14, for a given spatial orientation of the robotic finishing tool holding mechanism 10.

Consider the compliant robotic finishing tool holding mechanism 10 applying a finishing tool (say, a sander) to a side surface of a workpiece, with a constant, desired compliance force. This spatial orientation is selected for simplicity of explanation, as the weight of the tool does not require compensation. For this spatial orientation, the fore air chamber 32 pressure is a value calculated to be somewhat less than the aft air chamber 34 pressure, resulting in a net forward pressure of the piston, providing the desired compliance force. As the robot moves the tool across the workpiece surface, a local rise in the surface presses back against the tool, causing the inner housing 14 to retract within the main housing 12 (this is the essence of "compliance" motion). In this case, the aft air chamber 34 momentarily compresses, increasing its air pressure, and the fore air chamber momentarily expands, decreasing its air pressure. Without adjustment, this would increase the compliance force, as the piston 28 would be driven more strongly forward due to the greater delta of air pressures. To prevent this, a self-regulating valve in an external pressure regulator connected to the extend air supply port 18 rapidly bleeds off a small volume of air from the aft air chamber 34, restoring the air pressure to the calculated value. Simultaneously, a self-regulating valve in a separate external pressure regulator connected to the retract air supply port 20 injects more compressed air into the fore air chamber 32, restoring the fore air chamber pressure to is previous value.

Similarly, when a local depression in the workplace surface later causes the inner housing 14 to extend further from the main housing 12, the process reverses—decreasing pressure in the aft air chamber 34 and increasing pressure in the fore air chamber 32. In this case, the external pressure regulators bleed off some air from the retract air supply port 20 to the atmosphere, and increase pressure to the extend air supply port 18, again restoring the determined aft-to-fore delta of piston pressure. This independent, dual air pressure regulation restores the proper piston force applied to the inner housing 14, which presses the tool against the workpiece with the desired compliance force, regardless of surface features on the workpiece encountered by the tool. In this manner, the compliant robotic finishing tool holding mechanism 10 provides a constant compliance force, regardless of movement of the inner housing 14 along its range of motion within the main housing 12.

This force control system is considered "passive," since the actual compliance force applied to a workpiece is not measured and regulated in a closed-loop control system (the definition of "active" force control). However, the "active" control of air pressure, via self-regulating valves in an external pressure regulator, to maintain a desired air pressure in the aft and fore air chambers 34, 32 of each piston 28, provides an indirect compliance force regulation that is superior to prior art passive force control devices. The compliant robotic finishing tool holding mechanism 10 according to embodiments of the present invention thus provides superior passive compliance force regulation, which is sufficient for a large class of workpiece surface finishing operations that do not justify the expense and complexity of true active force control devices.

The force vectors of FIG. 1 depict only three spatial orientations: one horizontal, and two vertical orientations. In general, however, a robotic tool, and hence the compliant robotic finishing tool holding mechanism 10, may assume any spatial orientation, and the weight of the tool must be countered, or supported, by the piston force of the compliant robotic finishing tool holding mechanism 10, while maintaining the desired compliance force with which the tool presses against a workpiece.

FIG. 4A depicts a compliant robotic finishing tool holding mechanism 10 in an arbitrary spatial orientation. The weight vector W, representing the weight of an attached tool (not shown) can be decomposed into an axial component Wa and a radial component Wr. The radial component Wr is absorbed by the compliant robotic finishing tool holding mechanism 10, and does not affect the compliance force. The axial component Wa will vary in dependence on the orientation of the tool.

FIG. 4B depicts the case of a tool applied to the underside of a workpiece, from beneath. The axial component of tool weight Wa is the entire tool weight, and the piston force P must be sufficient to support the tool weight Wa as well as the desired, constant compliance force C. In this orientation, P=Wa+C. FIG. 4C depicts the opposite case, where the robot is positioned above a workpiece. Here again, the entire tool weight is Wa. The piston force P in this case must counter the tool weight Wa in excess of the desired, constant compliance force C. In this orientation, P=Wa−C. Finally, FIG. 4D depicts an arbitrary, non-vertical, non-horizontal orientation. The axial component of the tool weight Wa here is less than the full tool weight W. Accordingly, a smaller piston force P is required to counter the tool weight Wa in excess of the desired, constant compliance force C. In all of FIGS. 4B-D, the compliance force C is constant; the axial component of tool weight Wa varies according to the tool orientation, and the piston force P varies as required to maintain C at a constant value. For any given spatial orientation, the required piston force P is calculated, and the corresponding different pressures in the fore and aft air chambers 32, 34 are calculated and communicated to the external pressure regulators connected to the retract and extend air supply ports 20, 18, respectively. As the robotic tool operates on a workpiece at any given spatial orientation, the compliant robotic finishing tool holding mechanism 10 operates as described above to apply a constant compliance force, as the inner housing 14 moves through its range of compliance motion in response to perturbations in the surface of the workpiece.

The required values of piston force P—and corresponding fore and aft air chamber 32, 34 pressures—to achieve a constant compliance force may be dynamically computed as the robot moves the tool through various spatial orientations. In one embodiment, the compliant robotic finishing tool holding mechanism 10 includes one or more sensors, such as an accelerometer, and it updates the fore and aft air chamber 32, 34 pressures as the sensor output changes, indicating changes in the tool spatial orientation. In another embodiment, the fore and aft air chamber 32, 34 pressures may be precomputed for a large number of tool spatial orientations, and the pressures retrieved from memory as the robot moves the tool. In this embodiment, the tool spatial orientation may be sensed, such as by an accelerometer, or may be communicated by the robot control system. In many cases, one chamber pressure may be maintained constant, and the other chamber pressure varied in response to the tool spatial orientation. For example, the aft air chamber 34 pressure may be set, and the fore air chamber 32 pressure varied, or vice versa.

Figure 5B:
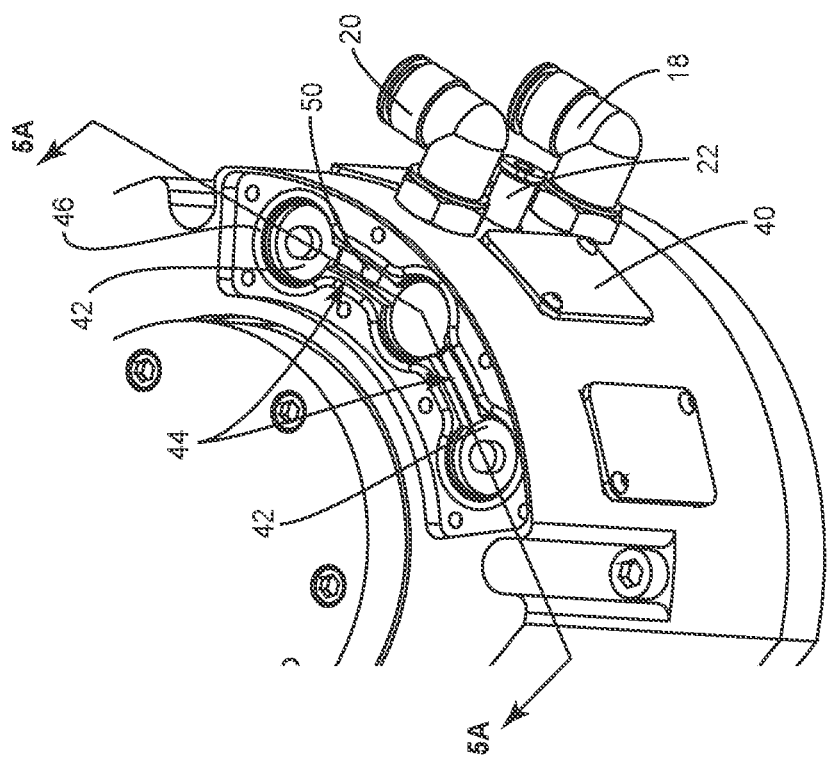
FIG. 5B is a perspective view of a pneumatic manifold connecting three piston bores.
Figure 5A:
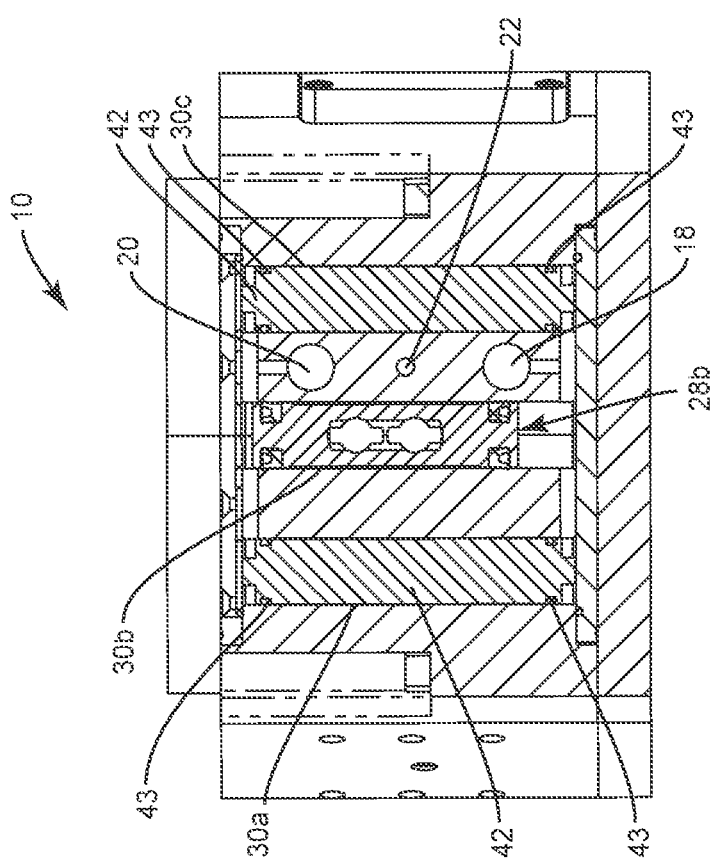
FIG. 5A is a section view showing multiple piston bores.

In order to amortize the cost of the compliant robotic finishing tool holding mechanism 10 over a plurality of tasks, it is contemplated that any number of robotic finishing tools may be attached to the tool interface plate 16. As these tools may vary greatly in weight, different amounts of piston force must be applied to counteract the axial component of tool weight, to provide the desired compliance force against a workpiece surface. According to one embodiment, as depicted in FIGS. 5A and 5B, a plurality of piston bores 30a, 30b, 30c are provided, allowing for a corresponding plurality of pistons 28a, 28b, 28c to be inserted. In applications where fewer pistons 28a, 28b, 28c are required than there are piston bores 30a, 30b, 30c, bore plugs 42 are deployed to seal off the unused piston bores 30a, 30b, 30c. For example, in FIGS. 5A and 5B, only one piston 28b is deployed, disposed in the center piston bore 30b. Piston bores 30a, 30c are sealed off using bore plugs 42.

To simplify the provision and regulation of pneumatic fluid, regardless of the number of pistons 28 deployed, all of the piston bores 30a, 30b, 30c are connected together by fore and aft pneumatic fluid manifolds 44, each comprising in one embodiment a groove formed in the main housing 12 between piston bores 30a and 30b, and between piston bores 30b and 30c. A seal 46, formed from a deformable member such as an o-ring, seals each pneumatic manifold 44 against a cap 48 attached to the main housing 12 (see FIGS. 3A, 3B). Additionally, o-rings 43 at each end of the bore plugs 42 seal the fore and aft pneumatic manifolds 44 from the empty piston bores 30a, 30c. The retract air supply port 20 is connected in pneumatic fluid flow relationship (e.g., by an appropriate bore 50 formed in the main housing 12) with the fore chamber manifold 44, and supplies retract air equally to the fore air chambers 32 of all deployed pistons 28. Similarly, the extend air supply port 18 is connected to the aft chamber manifold 44, supplying air at the same pressure to the aft air chambers 34 of all deployed pistons 28. Conceptually, all pistons 28 share a common fore air chamber 32 and aft air chamber 34. The bore plugs 42 limit the volumes of these common fore and aft air chambers 32, 34 to the space over each deployed piston 28, the space between the bore plugs 24 of unused piston bores 30 and the manifold cap 48, and the volumes of the manifold grooves 44.

In one embodiment, a sensor tracks the compliance motion of the inner housing 14 within the main housing 12. For example, a magnet may be affixed to the inner housing 14, and one or more Hall Effect sensors mounted in fixed positions, such as on a circuit board affixed to the main housing 12, sense the relative position of the magnet. In some applications, it is advantageous to provide a visual indication of the degree of compliance motion—that is, whether the inner housing 14 is nearly or full extended, partially extended, midway, and the like.

Figure 6:
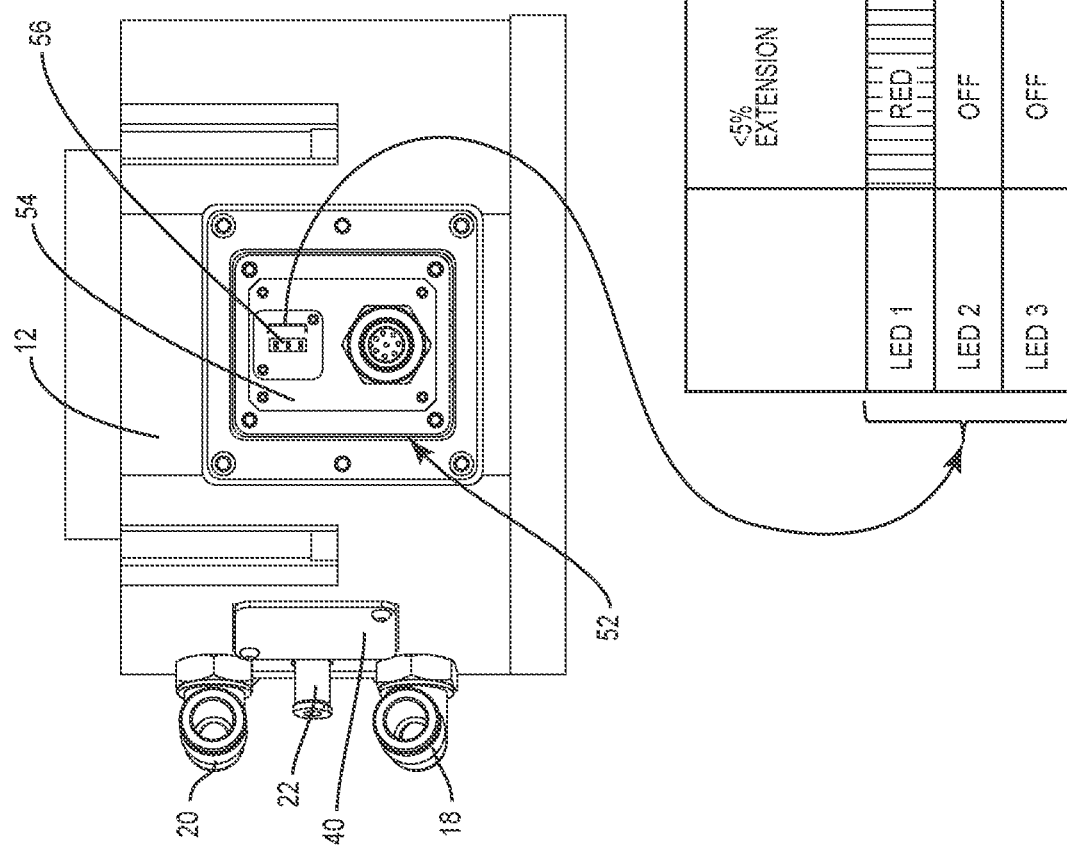
FIG. 6 is a view of a visible electronics board, with a table of LED output encodings.
Figure 7:
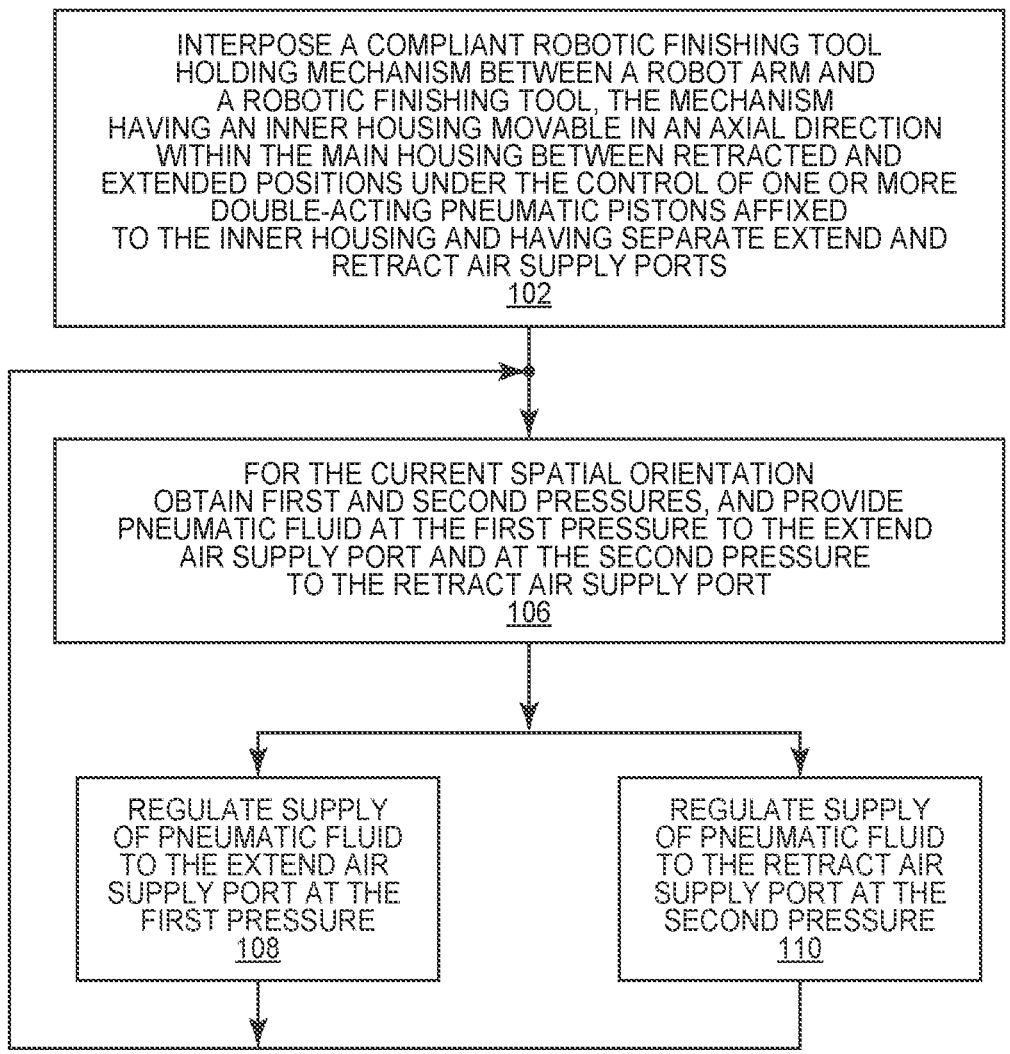
FIG. 7 is a flow diagram depicting steps of a method of passively controlling a compliance force pressing a robotic finishing tool against a workpiece.

FIG. 6 depicts a view of the compliant robotic finishing tool holding mechanism 10, showing a window 52, through which a circuit board 54 is visible. In one embodiment, three LEDs 56 are mounted on the circuit board 54, and visible through the window 52. The two LEDs 56 on the ends are red, and the LED 56 in the center is green. The three LEDs 56 operate together to provide a visual indication of the relative position of the inner housing 14 within the main housing 12, as indicated by the table of FIG. 6. This encoding allows a user to quickly assess the state of the compliant robotic finishing tool holding mechanism 10. Only a green LED indicates operation within a "safe" range, with plenty of reserve compliance motion in either direction. Both a red and green LED illuminated indicates operation at one end of the range—e.g., with less than 30% of the mechanism's compliance travel in that direction available. Finally, red only indicates that the mechanism 10 is near or at its maximum extent of travel in one direction. Those of skill in the art will readily recognize that the visual indication of inner housing 14 position depicted in FIG. 7 is representative only. Any number of LEDs 56, of any color or physical arrangement, may be employed, and the state of the compliant robotic finishing tool holding mechanism 10 encoded in any manner, to provide a quick visual indication of the state of the compliant robotic finishing tool holding mechanism 10.

FIG. 7 depicts the steps in a method 100 of passively controlling a compliance force pressing a robotic finishing tool against a workpiece. A compliant robotic finishing tool holding mechanism 10 is interposed between a robot arm and the robotic finishing tool (block 102). The compliant robotic finishing tool holding mechanism 10 has an inner housing 14 moveable in an axial direction within a main housing 12 between retracted and extended positions, under the control of one or more double-acting pneumatic pistons 28 affixed to the inner housing 14 and having separate extend and retract air supply ports 18, 20. For the current spatial orientation of the robotic finishing tool, first and second pressure values are obtained, and pneumatic fluid is provided at the first pressure to the extend air supply port 18 and at the second pressure to the retract air supply port 20 (block 106). The difference in first and second pressures determines a piston force P, and the compliance force C is a function of the piston force P and an axial component of the weight Wa of the robotic finishing tool at that spatial orientation.

While in a given spatial orientation, the supply of pneumatic fluid to the extend air supply port 18 is regulated to maintain the first pressure (block 108), and the supply of pneumatic fluid to the retract air supply port 20 is separately regulated to maintain the second pressure (block 110). This regulation (blocks 108, 110) is continuous and ongoing, for as long as the robotic finishing tool is maintained at the same spatial orientation.

When the robot moves the robotic finishing tool to a different spatial orientation, new values for the first and second pressures are obtained (block 106), wherein the new first and second pressure values generate a piston force P that, in conjunction with the axial component of the tool weight Wa, yields a desired compliance force C. In one embodiment, the first and second pressure values are dynamically calculated as the robot moves the robotic finishing tool through different spatial orientations, based on the output of a sensor in the compliant robotic finishing tool holding mechanism 10. In another embodiment, a plurality of pairs of first and second pressure values, each for a different spatial orientation of the robotic finishing tool, are calculated, associated with that spatial orientation, and stored. As the robot later moves the robotic finishing tool through different spatial orientations, the associated first and second pressure values are retrieved and applied.

Embodiments of the present invention present numerous advantages over the prior art. A compliant robotic finishing tool holding mechanism employs passive compliance force control (in response to compliance motion) to provide superior force control for a wide class of robotic surface finishing operations. Self-regulating air supplies providing pneumatic fluid to different sides of a double-acting piston maintain a constant compliance force applied to a workpiece throughout compliance motion of the holding mechanism. The piston force is adjusted in response to tool spatial orientation, to balance the axial component of tool weight and achieve a constant compliance force. A single compliant robotic finishing tool holding mechanism may be used with a wide variety of tools of different weights, by altering the number of double-acting pistons deployed. Pneumatic manifolds connect the fore and aft air chambers of the multiple pistons, and a bore plugs isolate the manifolds for the bores without pistons deployed.

As used herein, the term "configured to" means set up, organized, adapted, or arranged to operate in a particular way; the term is synonymous with "designed to."

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A compliant robotic finishing tool holding mechanism, comprising:
    a main housing;
    an inner housing moveable in an axial direction within the main housing between retracted and extended positions;
    one or more axially aligned piston bores formed in the main housing;
    an extend air supply port in pneumatic fluid flow relationship with an aft end of each of the one or more piston bores;
    a retract air supply port in pneumatic fluid flow relationship with a fore end of each of the one or more piston bores; and
    at least one double-acting pneumatic piston, each of the at least one piston being disposed in one of the one or more piston bores and affixed to the inner housing.

2. The mechanism of claim 1 comprising two or more piston bores and fewer pistons than piston bores, and further comprising:
    a bore plug disposed in each unused piston bore, without a piston disposed therein, the
        bore plugs configured to seal the unused bore from the respective retract and extend air supply ports.

3. The mechanism of claim 1 comprising two or more piston bores and further comprising:
    an aft air manifold in pneumatic fluid flow relationship with the extend air supply port and the aft ends of all piston bores; and
    a fore air manifold in pneumatic fluid flow relationship with the retract air supply port and the fore ends of all piston bores.

4. The mechanism of claim 3 wherein each of the aft and fore air manifolds comprises a groove formed in the main housing connecting the piston bores, a cap covering the groove, and a sealing member disposed between the cap and the main housing.

5. The mechanism of claim 1 wherein, for all piston bores in which a piston is disposed,
a same first pressure in an aft air chamber, comprising the piston bore aft of the piston,
is controlled by a first pressure regulator connected to the extend air supply port; and
a same second pressure in a fore air chamber, comprising the piston bore fore of the piston, is controlled by a second pressure regulator connected to the retract air supply port.

6. The mechanism of claim 1 further comprising:
a sensor configured to sense a position of the inner housing within the main housing; and
an indicator indicating a plurality of positions of the inner housing.

7. The mechanism of claim 6 wherein the position indicator indicates at least fully retracted and fully extended positions.

8. The mechanism of claim 6 wherein the position indicator comprises a plurality of Light Emitting Diodes, the selective illumination of which encode the plurality of positions of the inner housing.

9. A method of passively controlling a compliance force pressing a robotic finishing tool against a workpiece, comprising:
interposing a compliant robotic finishing tool holding mechanism between a robot arm and the robotic finishing tool, the mechanism having an inner housing moveable in an axial direction within a main housing between retracted and extended positions under the control of one or more double-acting pneumatic pistons affixed to the inner housing and having separate extend and retract air supply ports;
for a first spatial orientation of the robotic finishing tool, obtaining first and second pressure values, and providing pneumatic fluid at the first pressure to the extend air supply port and at the second pressure to the retract air supply port, whereby the difference in first and second pressures controls a piston force, and whereby the compliance force is a function of the piston force and an axial component of the weight of the robotic finishing tool at that spatial orientation; and
separately regulating the supplies of pneumatic fluid to the extend and retract air supply ports to maintain the first and second pressures, respectively, as the inner housing moves within the main housing.

10. The method of claim 9 further comprising:
moving the tool to a second spatial orientation; and
obtaining first and second pressure values for the second spatial orientation and providing pneumatic fluid at the first and second pressure values to the extend and retract air supply ports.

11. The method of claim 10 wherein obtaining first and second pressure values for each spatial orientation of the robotic finishing tool comprises dynamically calculating the first and second pressure values for each of a plurality of spatial orientations as the robot moves the robotic finishing tool.

12. The method of claim 11 wherein the spatial orientation of the robotic finishing tool is determined from the output of a sensor in the compliant robotic finishing tool holding mechanism.

13. The method of claim 10 wherein obtaining first and second pressure values for each spatial orientation of the robotic finishing tool comprises:
calculating first and second pressure values for each of a plurality of anticipated spatial orientations;
storing the plurality of first and second pressure values; and
as the robot moves the robotic finishing tool through different spatial orientations, retrieving the associated first and second pressure values.

* * * * *